US007937521B2

(12) United States Patent
Reid

(10) Patent No.: US 7,937,521 B2
(45) Date of Patent: May 3, 2011

(54) READ DISTURBANCE MANAGEMENT IN A NON-VOLATILE MEMORY SYSTEM

(75) Inventor: Robert Alan Reid, Superior, CO (US)

(73) Assignee: Cadence Design Systems, Inc., San Jose, CA (US)

( * ) Notice: Subject to any disclaimer, the term of this patent is extended or adjusted under 35 U.S.C. 154(b) by 513 days.

(21) Appl. No.: 12/022,146

(22) Filed: Jan. 29, 2008

(65) Prior Publication Data
US 2009/0193174 A1    Jul. 30, 2009

(51) Int. Cl.
*G06F 12/00*    (2006.01)
(52) U.S. Cl. ........ 711/100; 711/103; 711/165; 711/170; 711/E12.001; 711/E12.008; 365/185.11
(58) Field of Classification Search ................... 711/100, 711/103, 165, 170, E12.001, 12.008; 365/185.11
See application file for complete search history.

(56) References Cited

U.S. PATENT DOCUMENTS
2008/0181018 A1*    7/2008    Nagadomi et al. ....... 365/185.25
* cited by examiner

*Primary Examiner* — Jasmine Song
(74) *Attorney, Agent, or Firm* — Patent Venture Group; Jon A. Brock, II

(57) ABSTRACT

An invention is provided for read disturbance management in a non-volatile memory. The invention includes storing a read count data for a memory location in non-volatile memory. The read count data indicating an amount of read operations accessing the memory location since data was last written to the memory location. Then, when data is read from the memory location while the value of the read count data is less than a predetermined threshold value, the value of the read count data is incremented. However, when the value of the read count data equals the predetermined threshold value, the data is moved to a new memory location, thereby avoiding read disturbance effects.

18 Claims, 5 Drawing Sheets

| Logical Block Address | Memory Block Status Flags | Physical Block Address | Wear Level | Read Count |
|---|---|---|---|---|
| 0 | in use | 62 | 50 | 15472 |
| 1 | in use | 4093 | 155 | 25877 |
| 2 | in use | 5 | 250 | 1452 |
| 3 | in use | 4095 | 45 | 54793 |
| 4 | in use | 1 | 35 | 80566 |
| 5 | in use | 0 | 25 | 75888 |
| • | • | • | • | • |
| • | • | • | • | • |
| • | • | • | • | • |
| • | • | • | • | • |
| • | • | • | • | • |
| • | • | • | • | • |
| 4093 | Free | 4094 | 5 | 1456 |
| 4094 | Free | 2 | 15 | 85624 |
| 4095 | in use | 3 | 205 | 35842 |

| Logical Block Address | Memory Block Status Flags | Physical Block Address | Wear Level | Read Count |
|---|---|---|---|---|
| 0 | in use | 62 | 50 | 15472 |
| 1 | in use | 4093 | 155 | 25877 |
| 2 | in use | 5 | 250 | 1452 |
| 3 | in use | 4095 | 45 | 54793 |
| 4 | in use | 1 | 35 | 80566 |
| 5 | in use | 0 | 25 | 75888 |
| • | • | • | • | • |
| • | • | • | • | • |
| • | • | • | • | • |
| • | • | • | • | • |
| • | • | • | • | • |
| • | • | • | • | • |
| 4093 | Free | 4094 | 5 | 1456 |
| 4094 | Free | 2 | 15 | 85624 |
| 4095 | in use | 3 | 205 | 35842 |

READ DISTURBANCE MANAGEMENT IN A NON-VOLATILE MEMORY SYSTEM

BACKGROUND OF THE INVENTION

1. Field of the Invention

This invention relates generally to non-volatile memory, and more particularly to providing read disturbance management in a non-volatile memory system using a block table stored in non-volatile memory.

2. Description of the Related Art

In general, non-volatile memory is memory that stores data when power is disconnected from the system. Phase-change memory (PCM) and flash memory are examples of non-volatile computer memory in use today. Flash memory is a non-volatile computer memory that can be electrically erased and reprogrammed. Because flash memory retains stored data even when power to the memory is turned off, flash memory is widely used in battery-driven portable devices. For example, flash memory often is utilized in digital audio players, digital cameras, mobile phones, and USB flash drives, which are used for general storage and transfer of data between computers.

FIG. 1 is an illustration showing a typical prior art non-volatile memory arrangement. As illustrated in FIG. 1, a non-volatile memory 100 generally comprises a plurality of memory blocks 102, which generally is the smallest portion of memory that can be erased. Each memory block 102 generally comprises a fixed plurality of pages 104, which is the smallest size element that can be written or read from the non-volatile memory 100.

As data is being read from the memory 100, a phenomenon known as "read disturbance" can occur to adjacent memory cells in the memory 100. Read disturbance is caused when a page 104 is read from the memory 100 numerous times and adjacent memory cells are affected by electron migration to the point that the data stored in the adjacent cells is changed. In the past, a page in a Single Level Cell (SLC) memory, which contains one bit of data in each memory cell, could be read about one hundred thousand times before read disturbance would begin to cause changes in data in adjacent memory cells. However, since a single location rarely received one million reads, read disturbance did not present a large problem. Thus, for Single Level Cell (SLC) memory, read disturbance generally did not need to be accounted for by memory designers.

More recently, demand for greater storage capacity has lead to the use of multilevel-cell (MLC) memory, which contains two or more bits of data per cell, thereby increasing the storage capacity of the device. However, MLC memory is much less reliable than SLC memory. One aspect of the reduced reliability of MLC memory is a lower tolerance for read disturbance. More specifically, MLC memory generally reduces the number of reads that can occur before read disturbance begins to affect adjacent memory cells by a factor of ten. Thus, when using MLC memory, a location can only be read about ten thousand times before read disturbance begins to cause data changes in adjacent memory cells. As a result, unlike SLC memory, read disturbance in MLC memory can easily occur during normal operation of the memory.

In view of the foregoing, there is a need for methods for providing read disturbance management in a non-volatile memory. The methods should prevent changes in adjacent memory cells due to read disturbance. In addition, the methods should not require excessive memory usage and be easily usable by non-volatile memory file system.

SUMMARY OF THE INVENTION

Broadly speaking, the present invention addresses these needs by providing read disturbance management in a non-volatile memory system. Broadly speaking, embodiments of the present invention record the number of reads that occur for each block in the memory array. The read count is used to determine when to move data to a new location in order to prevent read disturbance effects from occurring. For example, in one embodiment a method for read disturbance management in a non-volatile memory that includes a plurality of memory blocks is disclosed. The method includes storing a read count data for a memory location in non-volatile memory. The read count data indicating an amount of read operations accessing the memory location since data was last written to the memory location. Then, when data is read from the memory location while the amount of read operations is less than a predetermined threshold value, the value of the read count data is adjusted. However, when the amount of read operations equals the predetermined threshold value, the data is moved to a new memory location, thereby avoiding read disturbance effects. For example, in one aspect, the predetermined threshold value can be less than a number of reads that can occur to a memory location of the non-volatile memory before data changes in adjacent memory cells due to read disturbance. In addition, once the data is moved to the new location, the value of the read count data associated with the memory location from which the data is moved and the value of the read count data associated the new memory location can both be reset.

A further method for read disturbance management in a non-volatile memory that includes a plurality of memory blocks is disclosed in an additional embodiment. The method includes loading a block table from a memory block of the non-volatile memory into system memory. Here, the block table includes read count data associated with each memory block of the non-volatile memory. As above, the read count data indicates the amount of read operations accessing the associated memory block since data was last written to the memory block. Then, when data is read from a memory block while the amount of read operations is less than a predetermined threshold value, the value of the associated read count data is adjusted.

However, when the amount of read operations is equal to the predetermined threshold value, the data stored in the associated memory block is moved to a new memory block. In one aspect, each memory block includes a plurality of pages and the value of the associated read count data is adjusted when data is read from any page of the plurality of pages while the amount of read operations is less than the predetermined threshold value. In this case, data stored in the entire memory block can be moved to the new memory block when the amount of read operations is equal to the predetermined threshold value.

A block table for use with a non-volatile memory is disclosed in a further embodiment of the present invention. The block table includes a plurality of entries corresponding to logical memory block addresses in a non-volatile memory. In addition, the block table includes a plurality of read count data entries, each associated with a logical memory block address, and each indicating an amount of read operations accessing the associated logical memory block address since data was last written to the associated logical memory block address. In operation, a value of a read count data entry is adjusted when data is read from the associated logical memory block address while the amount of read operations is less than a predetermined threshold value. In addition, data stored in the associated logical memory block address is moved to a new memory block when the amount of read operations is equal to the predetermined threshold value. The block table can further include a plurality of physical memory block addresses, each mapped to a particular logical memory block address, a plurality of memory block status flags, each indicating a status of an associated memory block, and a plurality of wear level indicators, each indicating a relative wear level of an associated memory block relative to other memory blocks of the non-volatile memory. The block table can be stored in a single memory block of the non-volatile memory, and loaded into system memory during power up.

As will be appreciate, an advantage of counting the reads within a block and comparing them to the predetermined threshold value for the non-volatile memory is that the worst and best case scenarios for reads are both covered. That is, repeated reads to one page of data, which is the worst case scenario for read disturbance, is protected because the predetermined threshold value generally is set based on the read disturbance threshold for a single memory location.

Moreover, reads distributed over all the pages of a memory block, which is the best case scenario for read disturbance, will trigger a data move earlier than absolutely required to prevent read disturbance. As a result, a guard band is essentially created that helps ensure that data is moved prior to read disturbance effects setting in.

Moreover, by keeping a count of the reads occurring to a memory block as opposed to individual pages, the memory needed to store the read count data for the memory is much less than that required to store the read counts for each individual page. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 2 is an illustration showing an exemplary block table storing read count data, in accordance with an embodiment of the present invention;

DETAILED DESCRIPTION OF THE PREFERRED EMBODIMENTS

An invention is disclosed for providing read disturbance management in a non-volatile memory system. Broadly speaking, embodiments of the present invention record the number of reads that occur for each block in the memory array. This information can be stored using a block table, which in one embodiment is stored in a memory block of the non-volatile memory. The read count is used to determine when to move data to a new location in order to prevent read disturbance effects from occurring. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
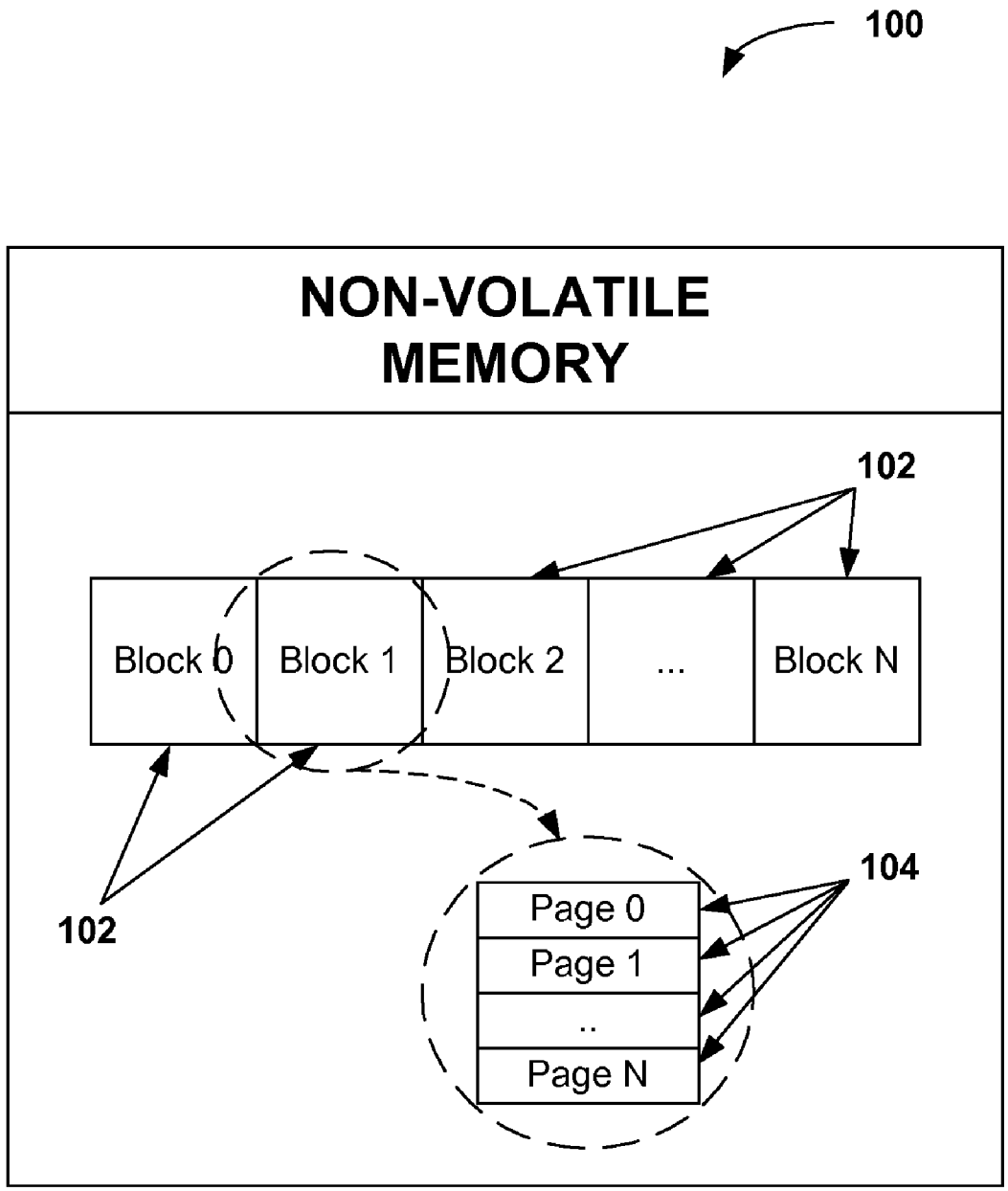
FIG. 1 is an illustration showing a typical prior art non-volatile memory arrangement.

FIG. 1 was described in terms of the prior art. FIG. 2 is an illustration showing an exemplary block table 200 storing read count data, in accordance with an embodiment of the present invention. The block table 200 includes logical block addresses 202, memory block status flags 204, physical block addresses 206, wear level indicators 208, and read count data 210. It should be noted, however, that a block table 200 of the embodiments of the present invention can include any data useful to the non-volatile file system in the operation of the non-volatile memory, as will be apparent to those skilled in the art after a careful reading of the present disclosure.

Each row of the bock table 200 corresponds to a particular logical block address 202, which is the memory block address used by the system when requesting access to data from the non-volatile memory. Thus, the data in each row of the block table 200 corresponds to the particular logical address 202 listed in the logical block address column of the block table 200. For example, the memory block status flags 204, physical address data 206, wear level indicators 208, and read count data 210 on row 1 of the block table 200 correspond to the logical address 1.

As mentioned above, each row of the block table 200 includes memory block status flags 204, a physical block address 206, a wear level indicator 208, and read count data 210. The memory block status flags 204 indicate the availability of a particular block. For example, the memory block status flags 204 can be utilized to indicate whether a particular block is bad (i.e., worn out), currently in use, free, or old data but not yet erased. The physical block address 206 stores the actual physical address in the non-volatile memory of the data associated with the corresponding logical address 202. The wear level indicator 208 stores the wear level for the associated physical block address 206. Generally, the wear level indicator 208 provides an indication of the wear level of the particular physical block address relative to the other physical block addresses in the non-volatile memory. The wear level data is utilized by the non-volatile memory file system to provide more even wear or use of the different memory block locations in the non-volatile memory.

The read count data 210 provides an indication of the number of reads occurring within the associated memory block. In operation, the read count data 210 associated with a particular memory block is adjusted, for example incremented, each time a page from the associated memory block is read from the non-volatile memory. When the read count 210 reaches a predetermined threshold value, the data stored in the associated memory block is moved to another memory block in physical memory. In one embodiment, the read count data 210 is a counter. For example, the counter can be large enough to store a value at least equal to the estimated highest number of reads that can occur to a memory location before read disturbance affects adjacent memory cells.

When accessing the non-volatile memory, the non-volatile memory file system utilizes the block table 200 for data related to the memory access. In this manner, the non-volatile memory file system can determine which memory block locations are available for storing data using the memory block status flags 204, which memory block locations have lower wear levels and thus provide wear leveling using the wear level indicators 208, the actual physical block address 206 of any particular logical block address 202 provided by the system, and the read count data 210 for each memory block. The block table 200 is updated to reflect the changes as data is written to and moved about the non-volatile memory.

As mentioned above, the read count data 210 associated with a particular memory block is adjusted each time a page from the associated memory block is read from the non-volatile memory. When the read count 210 reaches a predetermined threshold value, the data stored in the associated memory block is moved to another memory block in physical memory and the read count data 210 associated with both the old memory block location and the new memory block location both are reset. Since the entire memory block has been moved to a new location, read disturbance effects are avoided. That is, because the data is moved to a new physical location, read disturbance effects are not allowed to "build up" to a point at which read disturbance changes adjacent data. In one embodiment, the read count data 210 is stored in a block table 200, which is stored in non-volatile memory and is read into system memory during power-up, as described next with reference to FIG. 3.

Figure 3:
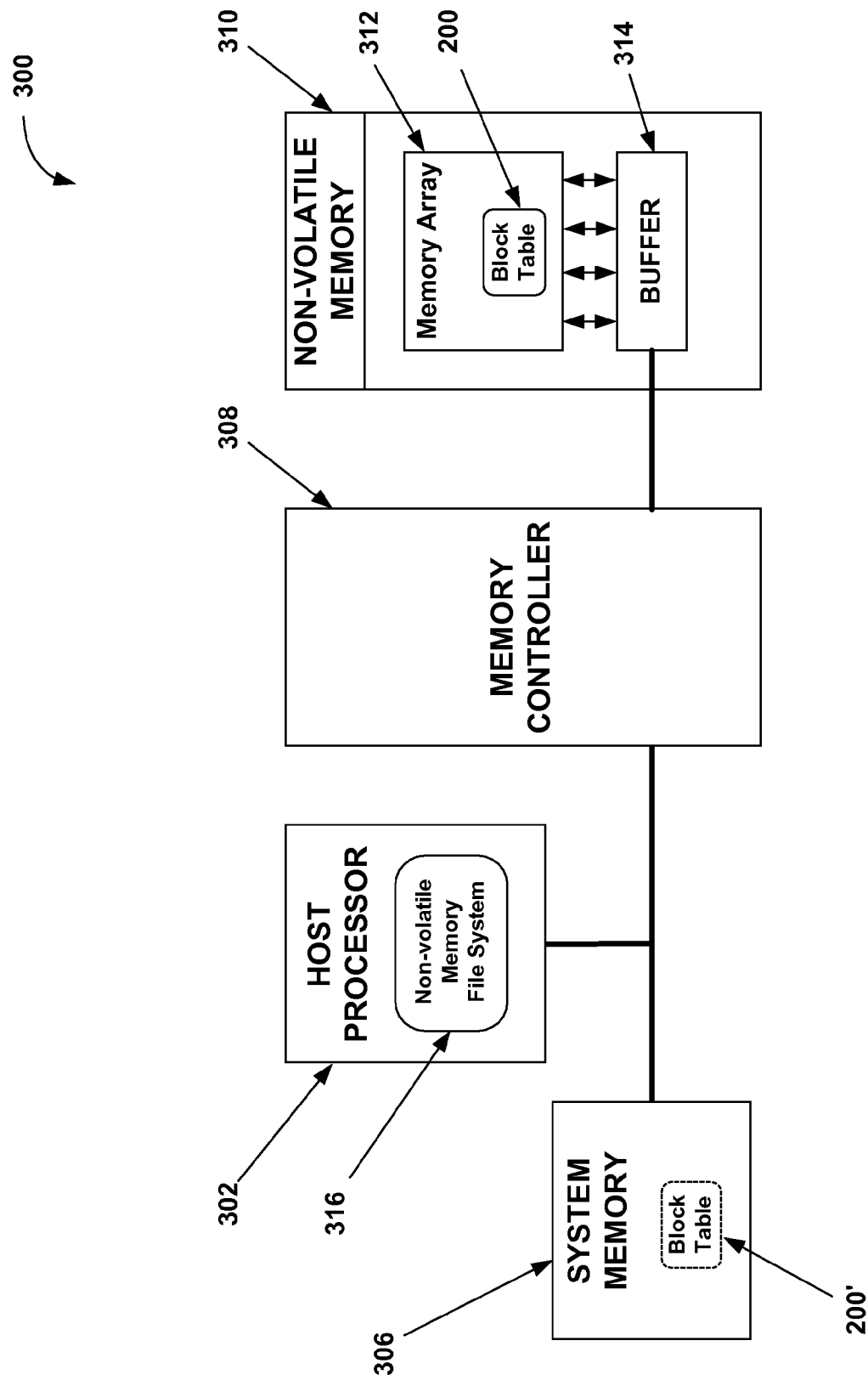
FIG. 3 is a diagram showing a system, which includes a block table storing read count data, in accordance with an embodiment of the present invention.

FIG. 3 is a diagram showing a system 300, which includes a block table 200 storing read count data, in accordance with an embodiment of the present invention. The system 300 includes a host processor 302 coupled to system memory 306 and a memory controller 308. The memory controller 308 is in communication with a non-volatile memory 310, which includes a memory array 312 coupled to a buffer 314. It should be noted that the non-volatile memory 310 can be any type of non-volatile memory, such as PCM, flash memory, or any other type of non-volatile memory as will be apparent to those skilled in the art after a careful reading of the present disclosure.

Executing on the host processor 302 is a non-volatile memory file system 316, which is utilized by the system to access data stored in the non-volatile memory 310. Although the non-volatile memory file system 316 is shown executing on the host processor 302 in the example of FIG. 3, it should be noted that the non-volatile memory file system 316 can run on other processors as needed by the system 300. In addition, a block table 200 is stored in a memory block of the memory array 312 of the non-volatile memory 310. As mentioned above, the block table 200 stores, inter alia, the read count data for the memory blocks of the memory array 312. In addition, the block table 200 stores much of the data needed by the non-volatile memory file system 316 for accessing data stored in the non-volatile memory 310. For example, in addition to the read count data the block table 200 includes address mapping, block status, and wear leveling data for the non-volatile memory 310.

At power-up the block table 200 is loaded from the non-volatile memory 310 into system memory 306. The block table 200' loaded in system memory 306 then is utilized by the non-volatile memory file system 316 to access data in the non-volatile memory 310. For example, when reading data from the non-volatile memory 310, the non-volatile memory file system 316 examines the block table 200' stored in system memory 306 to determine the read count data for the associated memory block. The read count data is utilized to ascertain whether the memory block should be moved to prevent read disturbance affects. If no data movement is required, the non-volatile memory file system 316 instructs the memory controller 308 to read the requested data in the memory array 312. Otherwise, the data is moved, as will be explained in greater detail subsequently.

As data is being accessed and moved in the non-volatile memory 310, the block table 200' in system memory 306 is updated to reflect the changes in the data stored in the non-volatile memory 310. Periodically, and at system shutdown, the block table 200' stored in system memory 306 is written to the non-volatile memory 310. It should be noted that the block table 200 can be written to a different location within the memory array 312 of the non-volatile memory 310 each time the block table 200 is written to the non-volatile memory 310.

Figure 4:
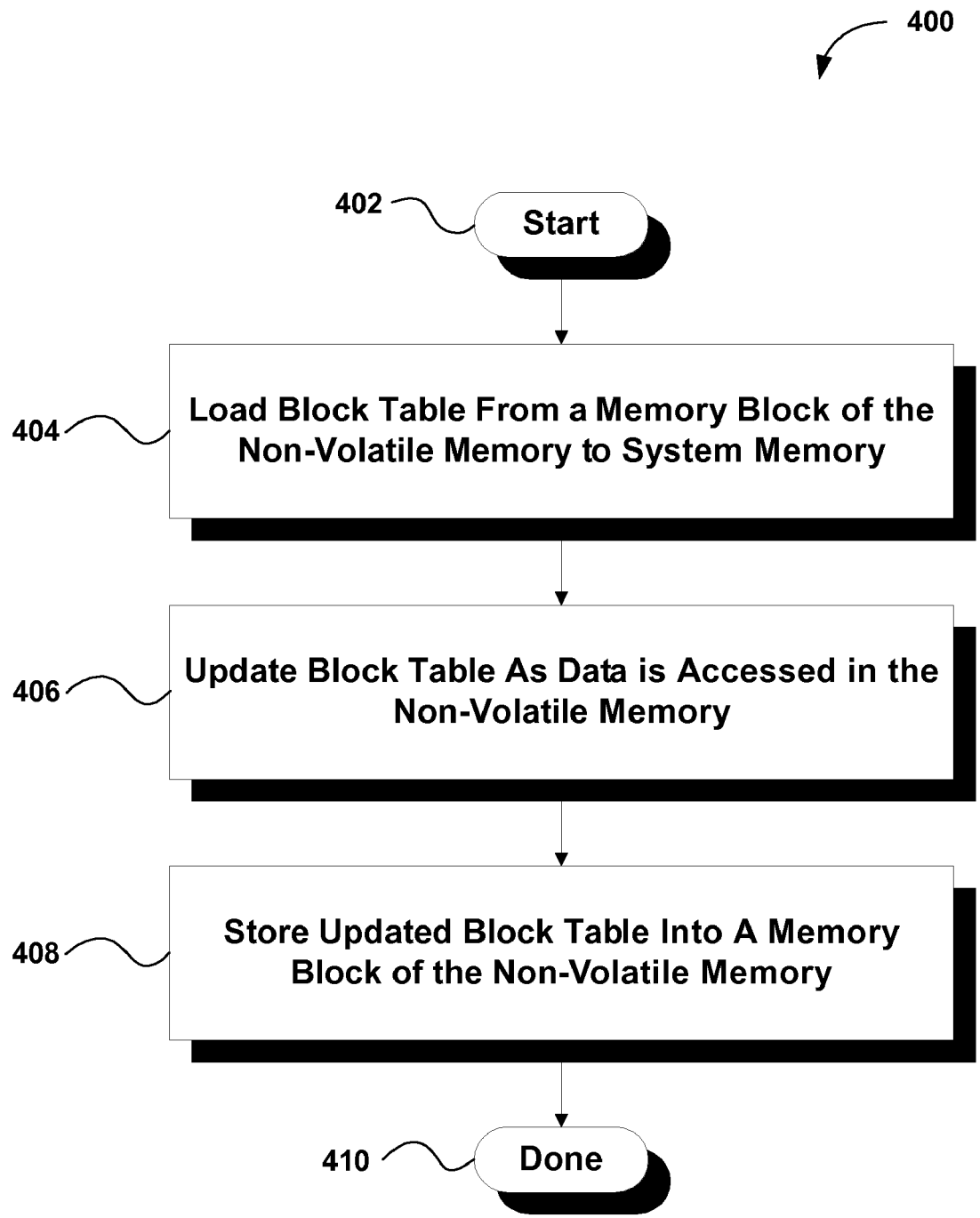
FIG. 4 is a flowchart showing a method for utilizing the block tabled stored in non-volatile memory, in accordance with an embodiment of the present invention.

FIG. 4 is a flowchart showing a method 400 for utilizing the block tabled stored in non-volatile memory, in accordance with an embodiment of the present invention. In an initial operation 402, preprocess operations are performed. Preprocess operations can include, for example, loading non-volatile memory file system into system memory, loading boot block data into system memory, and other preprocess operations that will be apparent to those skilled in the art after a careful reading of the present disclosure.

In operation 404, the block table is loaded from a memory block of the non-volatile memory into system memory. As mentioned above, during power-up the block table is read from non-volatile memory and stored in system memory for use by the non-volatile memory file system.

Once the block table has been loaded into system memory, the block table is updated as data is accessed in the non-volatile memory in operation 406. As illustrated in FIG. 3, the block table 200' loaded in system memory 306 is utilized by the non-volatile memory file system 316 to access data in the non-volatile memory 310, such as read count data. For example, to access data in the non-volatile memory 310, the non-volatile memory file system 316 examines the block table 200' stored in system memory 306 to determine the read count for the associated memory block to ascertain whether the memory block should be moved to prevent read disturbance effects. If no data movement is required, the non-volatile memory file system 316 instructs the memory controller 308 to read the requested data in the memory array 312. Otherwise, the data is moved, as will be explained in greater detail subsequently. As data is being accessed and moved in the non-volatile memory 310, the block table 200' in system memory 306 is updated to reflect the changes in the data stored in the non-volatile memory 310.

The updated block table is stored into a memory block of the non-volatile memory, in operation 408. As mentioned previously, periodically and at shutdown the block table is written to a memory block on non-volatile memory. In this manner, during power-up the entire block table can be read at once from the non-volatile memory rather than being pieced together from various locations in the non-volatile memory.

Post process operations are performed in operation 410. Post process operations can include, for example, additional updating of the block table, erasing the memory block storing the old block table, and other post process operations that will be apparent to those skilled in the art after a careful reading of the present disclosure. In this manner, embodiments of the present invention advantageously allow the block table to be loaded into system memory in one operation rather than having to be reconstructed each time the system boots as is required in prior art designs. In addition, read counts for each memory block stored in the block table can be used to prevent read disturbance affects from occurring in adjacent memory cells due to excessive reads to a single location.

Figure 5:
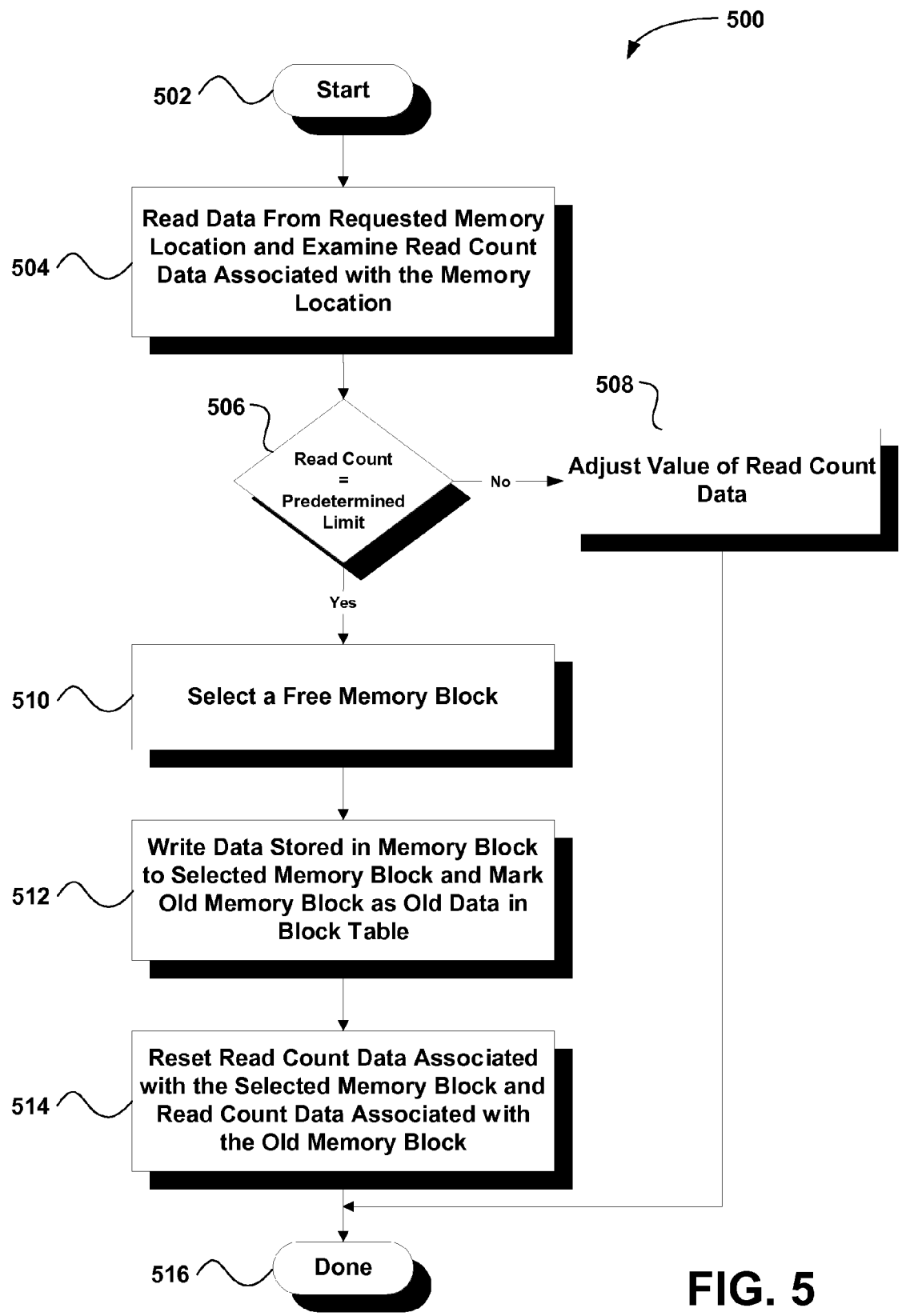
FIG. 5 is a flowchart showing a method for providing read disturbance management in a non-volatile memory system, in accordance with an embodiment of the present invention.

FIG. 5 is a flowchart showing a method 500 for providing read disturbance management in a non-volatile memory system, in accordance with an embodiment of the present invention. In an initial operation 502, preprocess operations are performed. Preprocess operations can include, for example, loading the block table into system memory, defining a predetermined threshold value for read counts for the non-volatile memory, receiving a read request, and other preprocess operations that will be apparent to those skilled in the art after a careful reading of the present disclosure.

In operation 504, data is read from the requested memory location and the read count data associated with the requested memory location is examined. Referring back to FIG. 3, when the host processor 302 needs to access data in the non-volatile memory 310, the host processor 302 sends a read request to the non-volatile memory file system 316. The non-volatile memory file system 316 then examines the block table 200' in system memory 306 to determine the actual physical address within the memory array 312 at which the requested data is located and the read count associated with the memory block in which the requested data is stored.

For example, in FIG. 2, the host processor may request data located at logical block address 3. In response, the non-volatile memory file system 316 examines the block table 200' at logical block address 3 to determine the actual physical memory block address of the data, which in the example of FIG. 2 is 4095. In addition, the non-volatile memory file system 316 examines the read count data 210 associated with logical address 3 to ascertain the value of the read count data associated with the requested memory block.

Turning back to FIG. 5, a decision is then made as to whether the value of the read count data for the requested memory block is equal to a predetermined threshold value for the memory array, in operation 506. As mentioned previously, the predetermined threshold value generally can be set to a value equal to or less than the estimated maximum number of reads the particular memory array can undertake before read disturbance effects begin to change data in adjacent memory cells. For example, MLC memory generally can be read about ten thousand times before read disturbance begins to cause data changes in adjacent memory cells. Thus, when using MLC memory, the predetermine threshold value can be set to a value less than one hundred thousand, for example, the predetermine threshold value can be set to ninety thousand. Although the above examples discuss typical values for MLC memory, it should be noted that any value can be used for the predetermined threshold value so as to reduce or prevent read disturbance effects in the non-volatile memory. If the value of the read count data for the requested memory block is less than the predetermined threshold value for the memory array, the method 500 branches to a operation 508. Otherwise, the method 500 continues to operation 510.

In operation 508, the value of the read count data associated with the requested memory location is incremented. For example, referring back to FIG. 2, when data for logical block address 3 is read, the non-volatile memory file system examines the read count data 210 associated with logical block address 3. This value then is compared with the predetermined threshold value. If the value of the read count data 210 associated with logical block address 3 is less than the predetermined threshold value, the read count data 210 associated with logical block address 3 is incremented. Hence, in the example of FIG. 2, the value of the read count data 210 associated with logical block address 3 would be incremented from 54793 to 54794. Turning back to FIG. 5, once the read count data is incremented, the method 500 is completed in operation 516.

If the value of the read count data for the requested memory block is equal to the predetermined threshold value for the memory array, the data stored in the memory is moved to prevent read disturbance effects. In particular, the non-volatile memory file system selects a free memory block in which to move the requested data, in operation 510. Referring to FIG. 2, the non-volatile memory file system examines memory block stat flags 204 in the block table 200' to find a free memory block. As discussed previously, the memory block status flags 204 indicate the availability of a particular block. For example, the memory block status flags 204 can be utilized to indicate whether a particular block is bad (i.e., worn out), currently in use, free, or old data but not yet erased. Thus, in operation 510, the non-volatile memory file system examines the memory block status flags 204 to find a memory block that has its associate memory block status flags 204 set to indicate the memory block is free. That is, the memory block has not yet been used, or has been erased, and is available to store new data.

Referring back to FIG. 5, the requested data that was read in operation 504 is written to the selected memory block and the old memory block is marked as old data in the block table, in operation 512. The memory block from which the requested data was read in operation 504 is referred to hereinafter as the old memory block, while the free memory block selected in operation 510 is referred to hereinafter as the selected memory block. For example, turning to FIG. 2, in operation 512 the memory block status flags 204 of the old memory block are set to indicate that the data is old data but not yet erased. In addition, the memory block status flags 204 of the selected memory block that now stores a copy of the requested data are set to indicate that the selected memory block is currently in use.

Referring back to FIG. 5, the value of the read count data associated with the selected memory block and the value of the read count data associated with the old memory block are both set to zero, in operation 514. As discussed above, when the value of the read count data associated with a memory block is equal to the predetermined threshold value, the data stored in the associated memory block is moved to a free memory block in the memory array. Once the data is moved, the read disturbance risks associated with data reads to the location are effectively "reset." As such, the value of the read count data associated with both the selected memory block into which the data was moved, and the old memory block from which the data was initially read, are reset to a value of zero to indicate the read disturbance risks for both locations are now minimal until new reads again being to increase read disturbance risks.

Post process operations are performed in operations 516. Post process operations can include, for example, erasing the old memory block from which the data was moved, continued incrementing of the read count data associated with the selected memory block in response to additional reads to that location, and other post process operations that will be apparent to those skilled in the art after a careful reading of the present disclosure. As will be appreciate, an advantage of counting the reads within a block and comparing them to the predetermined threshold value for the non-volatile memory is that the worst and best case scenarios for reads are both covered. That is, repeated reads to one page of data, which is the worst case scenario for read disturbance, is protected because the predetermined threshold value generally is set based on the read disturbance threshold for a single memory location. Moreover, reads distributed over all the pages of a memory block, which is the best case scenario for read disturbance, will trigger a data move earlier than absolutely required to prevent read disturbance. As a result, a guard band is essentially created that helps ensure that data is moved prior to read disturbance effects setting in. Moreover, by keeping a count of the reads occurring to a memory block as opposed to individual pages, the memory needed to store the read count data for the memory is much less than that required to store the read counts for each individual page.

Alternatively, the counters in the foregoing description that start at zero and are incremented once for each read, could be initialized to any initial value, incremented or decremented, and compared to a corresponding appropriate value. For example, the counter(s) could be initialized to the predetermined value, decremented, and checked against a zero value.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for read disturbance management in a non-volatile memory which includes a plurality of memory blocks, comprising the operations of:

loading a block table from a single memory block of the non-volatile memory into system memory, the block table including a plurality of entries mapping a physical block address of the non-volatile memory to a logical block address of the non-volatile memory;

maintaining read count data in the block table for a non-volatile memory location, wherein the read count data indicates an amount of read operations accessing the memory location since data was last written to the memory location;

modifying a value of the read count data when data is read from the memory location while the amount of said read operations is less than a predetermined threshold value; and moving the data to a new memory location when the value of the amount of said read operations is equal to the predetermined threshold value.

2. A method as recited in claim 1, wherein the memory location is a memory block that includes a plurality of pages, wherein the value of the read count data is modified when data is read from any page of the plurality of pages while the amount of said read operations is less than the predetermined threshold value.

3. A method as recited in claim 2, wherein the data stored in the entire memory block is moved to a new memory block when the amount of said read operations is equal to the predetermined threshold value.

4. A method as recited in claim 1, further comprising the operation of setting a value of the read count data associated with the memory location from which the data is moved and setting a value of the read count data associated with the new memory location.

5. A method as recited in claim 4, further comprising the operation of storing the block table in a single memory block of the non-volatile memory.

6. A method as recited in claim 1, wherein the read count data is stored in a counter.

7. A method as recited in claim 1, wherein the predetermined threshold value is less than a number of reads that can occur to a memory location of the non-volatile memory before read disturbance causes data changes in adjacent memory cells.

8. A method for read disturbance management in a non-volatile memory which includes a plurality of memory blocks, comprising the operations of:

loading a block table from a single memory block of the non-volatile memory into system memory, the block table including a plurality of entries mapping a physical block address of the non-volatile memory to a logical block address of the non-volatile memory and read count data associated with each memory block of the non-volatile memory, wherein the read count data indicates an amount of read operations accessing the associated memory block since data was last written to the memory block;

modifying a value of the read count data associated with a memory block when data is read from the associated memory block while the amount of said read operations is less than a predetermined threshold value; and moving the data from the associated memory block to a new memory block when the amount of said read operations is equal to the predetermined threshold value.

9. A method as recited in claim 8, wherein each memory block includes a plurality of pages, and wherein the value of the read count data is modified when data is read from any page of the plurality of pages of the associated memory block while the amount of said read operations is less than the predetermined threshold value.

10. A method as recited in claim 9, wherein data stored in the entire memory block is moved to a new memory block when the amount of said read operations is equal to the predetermined threshold value.

11. A method as recited in claim 8, further comprising the operation of storing the block table in a single memory block of the non-volatile memory.

12. A method as recited in claim 11, further comprising the operation of loading the block table into system memory during power up.

13. A method as recited in claim 8, wherein the predetermined threshold value is less than a number of reads that can occur to a memory location of the non-volatile memory before read disturbance causes data changes in adjacent memory cells.

14. A block table for use with a non-volatile memory, comprising:

a plurality of entries corresponding to logical memory block addresses in a non-volatile memory; and a plurality of read count data entries, each associated with a logical memory block address, each read count data entry indicating an amount of read operations accessing the associated logical memory block address since data was last written to the associated logical memory block address, wherein a value of a read count data entry is modified when data is read from the associated logical memory block address while the amount of said read operations is less than a predetermined threshold value, and wherein data stored in the associated logical memory block address is moved to a new memory block when the amount of said read operations is equal to the predetermined threshold value.

15. A block table as recited in claim 14, further comprising a plurality of physical memory block addresses, wherein each physical memory block address is mapped to a particular logical memory block address.

16. A block table as recited in claim 14, further comprising a plurality of memory block status flags, wherein each memory block status flag indicates a status of an associated memory block.

17. A block table as recited in claim 14, further comprising a plurality of wear level indicators, each wear level indicator indicating a relative wear level of an associated memory block relative to other memory blocks of the non-volatile memory.

18. A block table as recited in claim 14, wherein the block table is stored in a single memory block of the non-volatile memory, and wherein the block table is loaded into system memory during power up.

* * * * *